US011143248B2

(12) United States Patent
Pollak et al.

(10) Patent No.: US 11,143,248 B2
(45) Date of Patent: Oct. 12, 2021

(54) METHOD FOR REGULATING THE ENGAGEMENT POSITION OF A POSITION-CONTROLLED CLUTCH UNIT AND TORQUE TRANSMISSION ARRANGEMENT DESIGNED TO CARRY OUT THE METHOD

(71) Applicant: Magna Powertrain GmbH & Co KG, Lannach (AT)

(72) Inventors: Sebastian Pollak, Graz (AT); Franz Faschinger, Graz (AT); Ivan Sebastiani, Stattegg (AT); Peter Zoehrer, Lieboch (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 0 days.

(21) Appl. No.: 16/962,837

(22) PCT Filed: Nov. 27, 2018

(86) PCT No.: PCT/EP2018/082671
§ 371 (c)(1),
(2) Date: Jul. 16, 2020

(87) PCT Pub. No.: WO2019/141421
PCT Pub. Date: Jul. 25, 2019

(65) Prior Publication Data
US 2020/0370609 A1    Nov. 26, 2020

(30) Foreign Application Priority Data
Jan. 17, 2018  (DE) .......................... 102018200745.4

(51) Int. Cl.
*F16D 13/52* (2006.01)
*F16D 48/06* (2006.01)
(Continued)

(52) U.S. Cl.
CPC ............. *F16D 48/06* (2013.01); *F16D 13/52* (2013.01); *F16D 13/72* (2013.01); *F16D 13/74* (2013.01);
(Continued)

(58) Field of Classification Search
CPC .......... F16D 48/06; F16D 13/52; F16D 13/72; F16D 13/74; F16D 2500/10412;
(Continued)

(56) References Cited

U.S. PATENT DOCUMENTS 7,032,733 B2   4/2006   Parigger
7,111,716 B2   9/2006   Ekonen et al.
(Continued)

FOREIGN PATENT DOCUMENTS

DE   102008032477 A1   1/2010
DE   102015213151 A1   1/2017
WO     2003025422 A1   3/2003

OTHER PUBLICATIONS

International Search Report and Written Opinion dated Apr. 15, 2019 from International Patent Application No. PCT/EP2018/082671 (with English Translation of International Search Report).

*Primary Examiner* — David J Hlavka
(74) *Attorney, Agent, or Firm* — Dickinson Wright PLLC (57) ABSTRACT

The present invention relates, inter alia, to a method for regulating the engagement position of a position-controlled clutch unit for a drive train of a motor vehicle. The clutch unit has at least one wet-running friction clutch for the controllable transmission of a torque from an input element to an output element and an actuator for setting the engagement position for the purposes of mutual compression of the input and output elements. The method compensates a time-dependent setting behavior of the friction clutch on the basis of the uptake of lubrication oil of the friction clutch,
(Continued)

which varies over time, in that the engagement position of the clutch unit is regulated by means of the actuator as a function of the time-dependent setting behavior.

12 Claims, 7 Drawing Sheets

(51) Int. Cl.
*F16D 13/72* (2006.01)
*F16D 13/74* (2006.01)

(52) U.S. Cl.
CPC ............ *F16D 2500/1045* (2013.01); *F16D 2500/10412* (2013.01); *F16D 2500/3051* (2013.01); *F16D 2500/3081* (2013.01); *F16D 2500/30406* (2013.01); *F16D 2500/30415* (2013.01); *F16D 2500/30426* (2013.01); *F16D 2500/3166* (2013.01); *F16D 2500/70276* (2013.01)

(58) Field of Classification Search
CPC ... F16D 2500/1045; F16D 2500/30406; F16D 2500/30415; F16D 2500/30426; F16D 2500/3051; F16D 2500/3081; F16D 2500/3166; F16D 2500/70276; F16D 2500/30412; F16D 2500/50257; F16D 2500/5106; F16D 2500/70252; F16D 2500/7041; F16D 2500/70615; F16D 2500/70668; F16D 48/00
See application file for complete search history.

(56) References Cited

U.S. PATENT DOCUMENTS

2016/0047714 A1* 2/2016 Fujii ...................... F16D 48/06
 73/115.04
2017/0284485 A1* 10/2017 Tsunashima .......... F16D 48/064

\* cited by examiner

METHOD FOR REGULATING THE ENGAGEMENT POSITION OF A POSITION-CONTROLLED CLUTCH UNIT AND TORQUE TRANSMISSION ARRANGEMENT DESIGNED TO CARRY OUT THE METHOD

CROSS-REFERENCE TO RELATED APPLICATIONS

This application is a National Stage of International Application No. PCT/EP2018/082671, filed Nov. 27, 2018, which claims priority to DE102018200745.4, filed Jan. 17, 2018. The entire disclosures of each of the above applications are incorporated herein by reference.

FIELD OF THE INVENTION

The present invention relates, inter alia, to a method for regulating the engagement position of a position-controlled clutch unit for a drive train of a motor vehicle, wherein the clutch unit has at least one wet-running friction clutch for the controllable transmission of a torque from an input element to an output element of the friction clutch, and an actuator for setting the engagement position for the purposes of mutual compression of the input and output elements.

BACKGROUND OF THE INVENTION

This section provides information related to the present disclosure which is not necessarily prior art Such a clutch unit serves, for example in a transfer case of a motor vehicle with all-wheel drive, to carry out controllable transmission of a drive torque to a primary axle and/or to a secondary axle of the motor vehicle. In the case of a so-called "torque on demand" transfer case, the wheels of the primary axle are driven continuously, while a variable part of the drive torque can be optionally transmitted to the wheels of the secondary axle by means of the abovementioned clutch unit. The transfer case can also be embodied as a controllable central differential in which the clutch unit is assigned to a differential lock, in order to set the distribution of the drive torque in the longitudinal direction of the vehicle. A clutch unit of the specified type can also be applied in a torque transmission arrangement which permits the transmission of part of the drive torque to the rear axle in a motor vehicle with a continuously driven front axle, wherein the unit is arranged, for example, on the front axle differential or on the rear axle differential. Such different applications and arrangements are known, for example, from U.S. Pat. No. 7,111,716 B2.

A clutch unit of the type mentioned at the beginning can also act in the transverse direction of the motor vehicle, for example for a differential lock of an axle differential or in a torque superimposition arrangement of an axle differential (so-called "torque vectoring"). In all of the abovementioned cases, the clutch unit can connect a rotating input element with at least one input disk, which is provided with a friction lining, and a rotating output element with at least one output disk, which is provided with a friction lining, to one another in a frictionally locking fashion, to be precise, in particular, in order to transmit a drive torque. As an alternative to this, the clutch unit can be configured as a brake with a fixed input element or a fixed output element, to be precise, in particular, in order to transmit a braking torque.

In the abovementioned applications of the clutch unit, the clutch unit is arranged downstream of the main transmission of the drive train with respect to the direction of force of the power flow (i.e. downstream of the manual or automatic transmission or CVT transmission). The clutch torque—that is to say the torque which is actually transmitted by the friction clutch—is usually set in a variable fashion as a function of the respective driving situation. Depending on the respective driving dynamics requirements, which can depend, for example, on the driving situation or on environmental influences (e.g. a slippery roadway surface with slipping of the drive wheels occurring), a change in the torque which is to be transmitted by the clutch unit therefore takes place. This requires not only controlled engagement of the friction clutch but also often relatively long operation with a precisely set clutch torque. The friction clutch can therefore be embodied, in particular, as a wet-running multi-disk clutch with alternately arranged input disks and output disks as well as oil for cooling and lubricating the clutch unit.

The clutch unit also comprises an actuator for activating the friction clutch. The actuator often has an electric motor which is attached to the housing of the clutch unit and serves to move the clutch disks into a predetermined engagement position in response to a requested torque which is to be transmitted between the input element and the output element of the clutch unit.

A clutch unit of the type mentioned at the beginning and a method for calibrating such a clutch unit are known from WO 2003/025422 A1 (corresponding to U.S. Pat. No. 7,032,733 B2), the content of which is expressly included in the disclosure content of the present application. As is described in more detail in WO 2003/025422 A1, a direct torque regulating means does not necessarily have to be provided in order to set a specific desired clutch torque (with the desired actual clutch torque as a regulating variable). Instead, the friction clutch can be controlled by means of position regulation by the actuator on the basis of corresponding calibration of the clutch unit. In order to set the desired torque to be transmitted, for example the rotational angle of the electric motor or some other positional variable of the actuator is therefore used as a regulating variable and set to a value which corresponds to the desired clutch torque. A clutch torque/actuator position dependence is determined empirically for this, said dependence being stored as a characteristic curve, for example in the form of a table (look up table, LUT) or a function (that is to say a calculation rule). Therefore, for a specific torque request the corresponding setpoint value of the respective positional variable of the actuator (e.g. rotational angle) is determined and applied on the basis of this dependence.

As has already been explained above, the friction clutch is compressed, while it is operating, by means of the actuator, for which purpose an axial force is applied to the friction clutch by means of the actuator. If this force is maintained over a relatively long time period, this can lead to a situation in which the maximum torque which can be transmitted without slip via the friction clutch—the so-called locking torque—decreases over time owing to time-dependent setting processes within the friction clutch. Such setting phenomena can be due, for example, to the fact that the uptake of lubrication oil of the friction clutch decreases slightly over time owing to its compression by the actuator. Therefore, for example, the friction linings of the clutch disks can in fact take up a certain quantity of lubrication oil, as a result of which the volume of the friction linings increases slightly. If the friction clutch is then compressed by the actuator, a certain quantity of lubrication oil is pressed out of the friction linings over time, with the result that the friction linings experience a certain decrease in volume, and therefore become somewhat thinner in the axial direction. This results in turn in the axial force or compression force between the disks and therefore the torque decreasing with constant engagement of the friction clutch.

If, on the other hand, the axial force which is applied to the friction clutch is removed again or at least reduced, the friction linings can take up additional lubrication oil again over time with the result that the friction linings expand again over time, which can result in an undesired increase in the locking torque.

The setting behavior which has been described above has the result that in a position-controlled clutch unit the relationship between the amount by which the friction clutch is compressed and the resulting axial force, which is proportional to the locking torque of the clutch, changes as a function of time. If this setting behavior is not taken into account during the actuation of a friction clutch by the actuator, this can undesirably give rise to positioning inaccuracies.

SUMMARY OF THE INVENTION

This section provides a general summary of the disclosure, and is not a comprehensive disclosure of its full scope or all of its features.

The invention is therefore based on the object of ensuring in a position-controlled clutch unit that there is a high degree of positioning accuracy during different operating states.

According to a first aspect of the invention this object is achieved by means of a method for regulating the engagement position of a position-controlled clutch unit having the features of claim 1 and, in particular, is achieved by virtue of the fact that a time-dependent setting behavior of the friction clutch is compensated as a result of axial compression by the actuator on the basis of the uptake of lubrication oil of the friction clutch, which varies over time, in that the engagement position of the clutch unit is regulated by means of the actuator as a function of the time-dependent setting behavior.

According to another aspect, the object on which the invention is based is also achieved by means of a torque transmission arrangement having a position-controlled clutch unit and a control device, wherein the torque transmission arrangement has the features of claim 9.

According to the invention there is therefore provision to detect the time-dependent setting behavior of the friction clutch, which can also have other causes than the varying uptake of lubrication oil of the friction clutch and to take into account this setting behavior during the determination of the regulating variable, as a function of which the engagement position of the clutch unit is regulated by means of the actuator. If therefore for the purpose of transmitting a defined locking torque a specific engagement position has been firstly brought about by means of the actuator and it is subsequently detected that the clutch sets over a certain time period, this setting behavior can be compensated according to the invention in that the engagement position is adjusted, and therefore compensated, by means of the actuator in accordance with the detected setting behavior.

In the text which follows, the preferred embodiments of the invention will be discussed. Further embodiments can result from the dependent claims, the description of the figures and the drawings.

Therefore, according to one embodiment there can be provision that the time-dependent setting behavior of the friction clutch is determined in that a current setting value or setting distance of the friction clutch is determined by means of a transmission element such as, for example, preferably a PT1 element as a low pass filter, which value or distance can then subsequently be taken into account within the scope of the regulation of the engagement position of the clutch unit during the determination of the regulating variable. The setting behavior of the friction clutch can therefore be modeled by program and taken into account within the scope of the actuation of the clutch unit in that the position or engagement position of the clutch unit is corrected as a function of the modeled setting behavior.

As will be explained in more detail below, according to the invention there is provision here that the model on which the regulating process is based can take into account not only the setting behavior of the actual driving mode but also setting processes which can occur if the vehicle is parked and therefore the modeling of the setting value is inactive.

Within the scope of the development of the present invention it has been observed that the setting value of a friction clutch generally asymptotically approaches a final setting value over time, wherein the speed of approach of the current setting value to the final setting value decreases continuously over time. Although such an asymptotic behavior can be modeled well with a PT1 element and, in particular, a low pass filter element, it has, however, also been observed that the speed of approach to the final setting value, which speed corresponds to the gradient of a PT1 element and in this respect corresponds to the time constant of a PT1 element is dependent on the axial force applied to the friction clutch and therefore on the locking torque of the clutch.

Correspondingly, according to a further embodiment of the present invention there can be provision that the transmission element is distinguished by an adjustable time constant, i.e. by a time constant which is not invariable, which can be determined, in particular, in a lubricated state of the friction clutch as a function of a desired locking torque of the clutch. However, since not only the axial force which is applied to the clutch, and therefore the locking torque, influence the speed of approach of the current setting value to the final setting value, and therefore on the time constant of the transmission element, but the rotational speed of the friction clutch also affects the speed of approach of the current setting value to the final setting value, during the determination of the time constant it is additionally possible to take into account a correction value which is representative of the current rotational speed of the friction clutch. Since the locking torque of the clutch changes continuously owing to the setting behavior of the clutch, the time constant also changes continuously within the scope of the regulation of the engagement position, as a result of which a high level of positioning accuracy of the clutch unit can be achieved in the desired way.

If lubricating oil is not applied to the clutch over a relatively long time, such as can be the case, for example, when the motor is switched off when the vehicle is waiting at a red traffic light, the time constant can, however, also be assigned a fixed value. According to the invention it has been recognized that during such a non-lubricated or dry state of the friction clutch the setting develops significantly differently than in a lubricated state. In order to allow for this different setting behavior, the time constant for the dry state can therefore be assigned a fixed value which, in particular, also does not need to be dependent on the locking torque of the friction clutch. This can prove advantageous insofar as during such a waiting phase, for example at a red traffic light, the calculation expenditure for determining the setting behavior can be reduced without this being at the expense of the positioning accuracy of the clutch unit.

Whether the lubricated or the non-lubricated or dry state is present can be determined here in accordance with the deactivation time of the vehicle and/or the clutch rotational speed. It is therefore possible, for example, to determine that there is a non-lubricated state of the friction clutch if it is detected that the motor vehicle has been or was parked for at least a predetermined deactivation time, such as can be the case, for example, when it is determined that the time integral plotted against the clutch rotational speed does not change over a predetermined time period or changes only insignificantly. In other words, the lubricated state can be present, as can equally be the case if a clutch rotational speed which is integrated over a predetermined time period exceeds a predetermined rotational speed value.

As has already been mentioned, according to one embodiment the current setting value of the friction clutch can be determined by means of a transmission element such as, for example, preferably a PT1 element. According to one preferred embodiment, in this context the current setting value can be determined as an output value of the transmission element in accordance with a calculated final setting value of the clutch as an input value of the transmission element, specifically irrespective of whether the friction clutch is in a lubricated state or in a non-lubricated state.

As has already been explained, the final setting value, which is also referred to here as a target setting value, can be dependent, inter alia, on the setting torque of the friction clutch. Accordingly, according to a further embodiment there can be provision to determine the final setting value in accordance with the locking torque of the friction clutch.

However, since not only the locking torque but also the wear of the friction clutch can affect its final setting value, according to a further embodiment there can be provision that equally a degree of wear of the friction clutch is taken into account during the determination of the final setting value. Said degree of wear can be determined, for example, by forming a time integral over the product of the clutch torque and a clutch slip in the form of a difference in rotational speed between the input element and the output element. The rotational speeds of the input element and of the output element can be easily sensed in this context by means of suitable sensors and are often in any case made available on a standard basis for various tasks of vehicle control. The clutch torque, which is input into the product to be integrated, can be a torque request (setpoint value) or the torque which is actually transmitted via the clutch (actual value) and which can for its part be measured or calculated. The clutch torque in turn relates to the axial force acting on the clutch disks. The difference in rotational speed between the input element and output element represents the slip occurring in the friction clutch. Therefore, the friction losses of the clutch disks and therefore also the degree of wear of the clutch can be inferred from the product of the axial contact pressure force and the slip.

In accordance with the above explanations, the transmission element requires, for the continuous determination of the current setting value as an output value, an input value in the form of the final setting value of the clutch, which value is modified in the next loop pass in accordance with the last determined current setting value. However, if the vehicle is activated again after a deactivation time of a predetermined length, it may be questionable at this time to what extent the clutch has set up to then. In order to initialize the transmission element, it is therefore possible, according to a further embodiment, to set the input value of said element to an estimated setting value which is preferably determined in accordance with a last determined setting value, a time which has passed since the determination of this last determined setting value and the final setting value.

The last determined setting value may be a setting value which has been calculated last as a current setting value before the vehicle was parked. On the other hand, if such a last determined current setting value is not present, as may be the case, for example, when the method according to the invention is carried out for the first time, the last determined setting value can be set to zero. The input value of the transmission element is therefore as it were interpolated between the final setting value and the last determined setting value. For this purpose, a weighting factor can be determined in accordance with the deactivation time or the time which has passed since the determination of the last determined setting value, on the basis of which weighting factor a weighting which is dependent on the deactivation time, between the final setting value and the last determined setting value, can be implemented. The input value of the transmission element can therefore be initialized to a setting value which, depending on the deactivation time, lies between the last determined setting value (deactivation time=zero) and the final setting value (in the case of very long deactivation times).

For the sake of completeness, it is to be noted at this point that the torque transmission arrangement according to the invention can be used in different arrangements in order to transmit torque along a drive train of a motor vehicle, as has been explained at the beginning. On the other hand, the invention will be explained below with reference to the drawings in a purely exemplary fashion in relation to a "torque on demand" transfer case in a purely exemplary fashion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
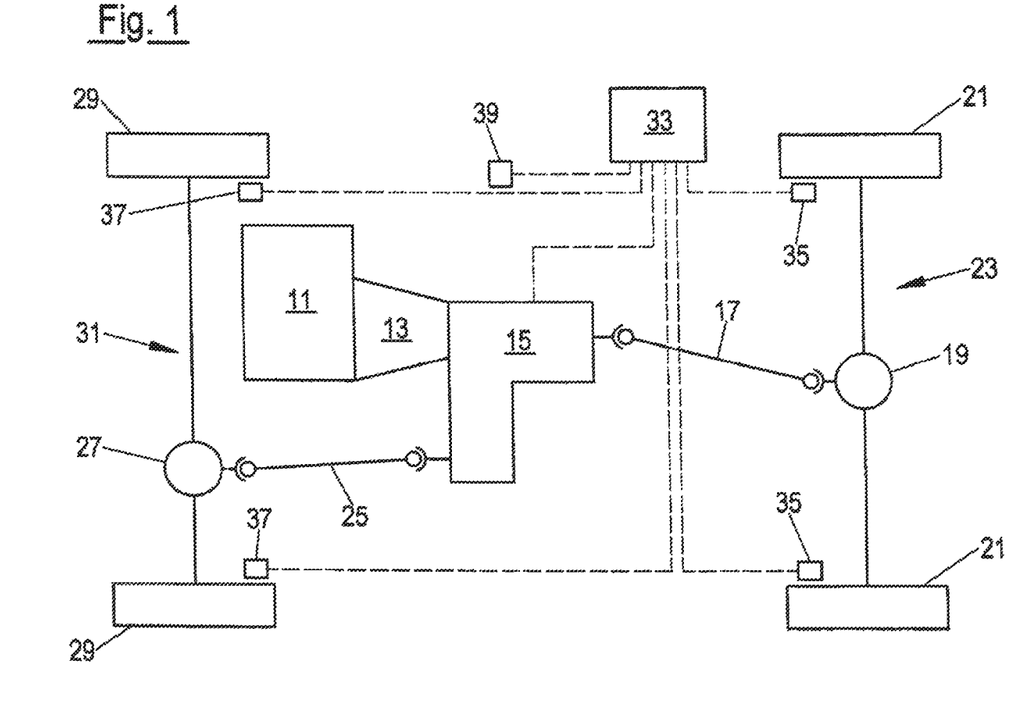
FIG. 1 shows a schematic view of a drive train of a motor vehicle.

FIG. 1 shows a schematic view of a drive train of a motor vehicle with an all-wheel drive which can be activated. The drive torque which is generated by an internal combustion engine 11 is fed to a transfer case 15 via a main transmission 13 (manual transmission or automatic transmission). A first output of the transfer case 15 is coupled to a rear-axle differential gear 19 via a cardan shaft 17. As a result, the wheels 21 of the rear axle 23 are continuously driven. The rear axle 23 therefore forms the primary axle of the vehicle. A second output of the transfer case 15 is connected to a front-axle differential gear 27 via a cardan shaft 25. As a result, part of the drive torque of the internal combustion engine 11 can be optionally transmitted to the wheels 29 of the front axle 31. The front axle 31 therefore forms the secondary axle of the vehicle.

In addition, FIG. 1 shows a driving dynamics regulating unit 33. The latter is connected to wheel rotational speed sensors 35, 37 which are assigned to the wheels 21 of the rear axle 23 or the wheels 29 of the front axle 31. The driving dynamics regulating unit 33 is also connected to further sensors 39, for example a yaw rate sensor. The driving dynamics regulating unit 33 generates, in accordance with the signals of the sensors 35, 37, 39, a control signal which is fed to a control device (not shown in FIG. 1) of the transfer case 15, in order as a result to set a specific distribution of the drive torque between the two axles 23, 31 of the vehicle. The abovementioned control signal is, in particular, a setpoint value of a clutch torque, i.e. a torque request for a clutch unit of the transfer case 15. This setpoint value of the clutch torque can be used as the basis for regulating the position of a friction clutch by an actuator, as will be further explained below.

Figure 2:
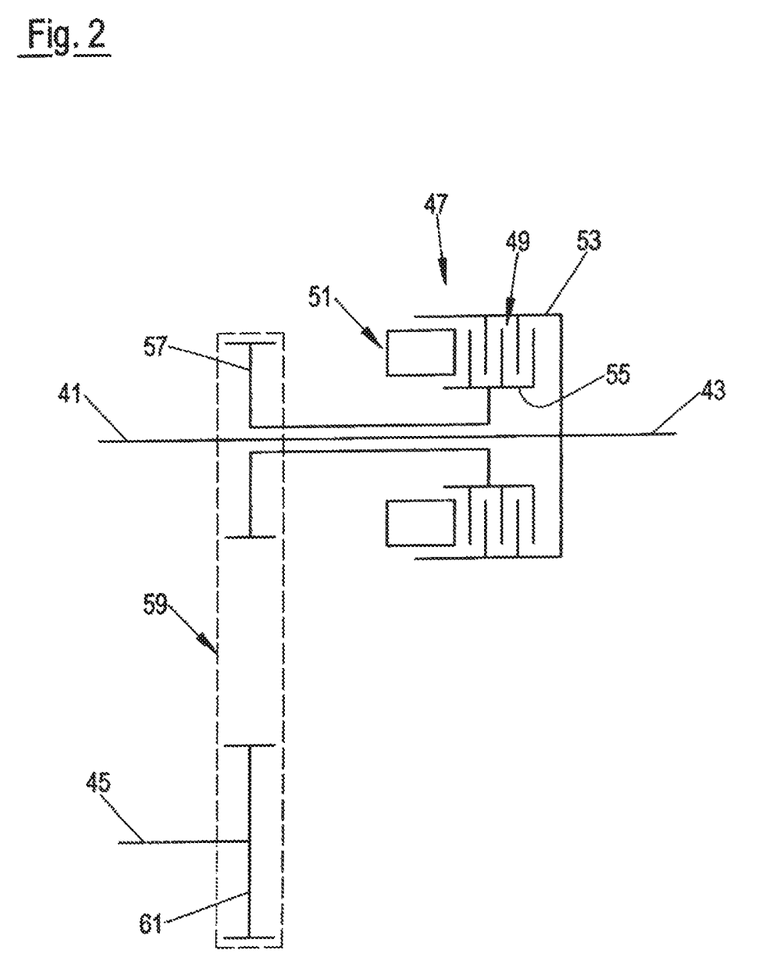
FIG. 2 shows a schematic view of a transfer case.

FIG. 2 shows a schematic cross-sectional view through the transfer case 15 according to FIG. 1. The transfer case 15 has an input shaft 41, a first output shaft 43 and a second output shaft 45. The first output shaft 43 is embodied coaxially with respect to the input shaft 41 and in a rotationally fixed fashion therewith—preferably in one piece. The second output shaft 45 is arranged with a parallel offset with respect to the input shaft 41.

The transfer case 15 has a clutch unit 47 with a friction clutch 49 and an actuator 51. The friction clutch 49 has a clutch basket 53 which is connected in a rotationally fixed fashion to the input shaft 41 and to the first output shaft 43 and has a plurality of clutch disks which are provided with friction linings. In addition, the friction clutch 49 has a rotatably mounted clutch hub 55, which also has a plurality of clutch disks which are provided friction linings and engage in an alternating arrangement in the disks of the clutch basket 53. The clutch hub 55 is connected in a rotationally fixed fashion to a drive gearwheel 57 of a chain drive 59. An output gearwheel 61 of the chain drive 59 is connected in a rotationally fixed fashion to the second output shaft 45. Instead of the chain drive 59 a gear drive can be provided, for example with an intermediate gearwheel between the abovementioned gearwheels 57, 61.

By activating the actuator 51 in the engagement direction of the friction clutch 49, an increasing portion of the drive torque which is applied to the transfer case 15 via the input shaft 41 can be transmitted to the second output shaft 45.

Figure 3:
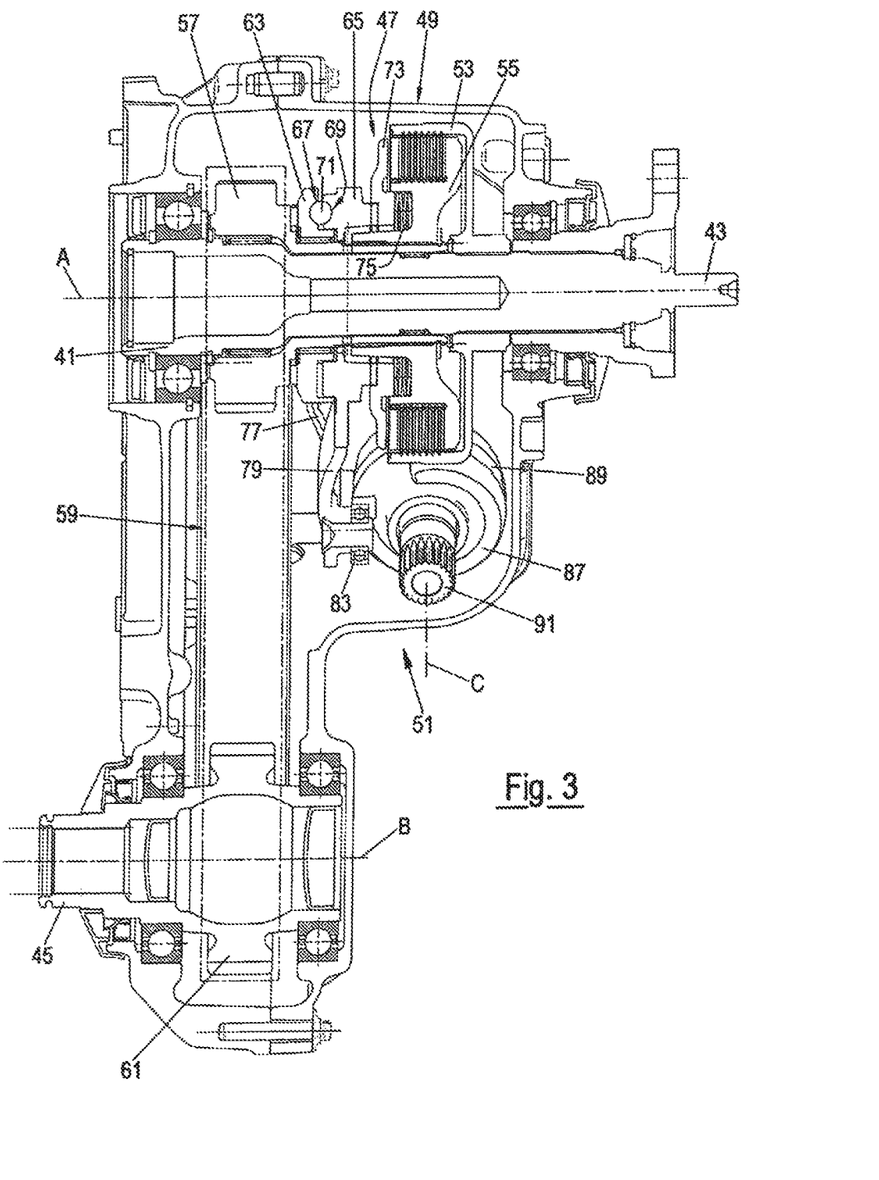
FIG. 3 shows a cross-sectional view of the transfer case according to FIG. 2.

FIG. 3 shows details of the transfer case 15 according to FIG. 2 in a cross-sectional view. It is apparent from this, in particular, that the actuator 51 has a supporting ring 63 and an adjustment ring 65 which are rotatably mounted with respect to the rotational axis A of the input shaft 41 and of the first output shaft 43. The supporting ring 63 is supported axially on the drive gearwheel 57 via an axial bearing. The adjustment ring 65 is, on the other hand, mounted in an axially displaceable fashion. On the sides facing one another, the supporting ring 63 and the adjustment ring 65 each have a plurality of ball grooves 67 and 69. These run in the circumferential direction with respect to the axis A and are inclined in a ramp-like fashion in the circumferential direction with respect to a normal plane in relation to the axis A, i.e. the ball grooves 67, 69 have a varying depth in the circumferential direction. In each case one ball groove 67 of the supporting ring 63 and one ball groove 69 of the adjustment ring 65 are located opposite one another and enclose an assigned ball 71 in this arrangement. By rotating the supporting ring 63 and the adjustment ring 65 relative to one another it is therefore possible to bring about axial displacement of the adjustment ring 65 wherein the adjustment ring 65 interacts with a contact pressure ring 73 of the friction clutch 49 via an axial bearing. The contact pressure ring 73 is prestressed in the disengagement direction of the friction clutch 49 by means of a disk spring arrangement 75.

A respective activation lever 77 and 79 is integrally formed onto the supporting ring 63 and onto the adjustment ring 65. A respective roller 81 and 83, respectively, is rotatably mounted on the free end of each lever 77, 79. The activation lever 77, 79 interacts with the two end faces 85, 87 of a control disk 89 via the rollers 81, 83, which disk is rotatable with respect to an axis C. The end faces 85, 87 have, with respect to a normal plane in relation to the axis C, a profile which is inclined in the circumferential direction, i.e. the control disk 89 is embodied in a wedge shape in the cross section. By rotating the control disk 89, the activation levers 77, 79 can therefore be moved in the manner of scissors in order to rotate the supporting ring 63 and the adjustment ring 65 relative to one another. The control disk 89 has an integrally formed-on spline attachment 91. By means of the latter the control disk 89 can be connected in an effective fashion in terms of drive to an electric motor and an assigned reduction gear (not shown in FIG. 3).

Therefore, by correspondingly actuating the abovementioned electric motor the control disk 89 can be driven to execute a rotational movement, in order as a result to pivot the activation levers 77, 79 relative to one another. The rotation of the supporting ring 63 and of the adjustment ring 65 relative to one another, which is caused as a result, brings about an axial movement of the adjustment ring 65. The contact pressure ring 73 therefore causes the friction clutch 49 to engage or—with support by the disk spring arrangement 75—causes the friction clutch 49 to disengage.

Figure 4:
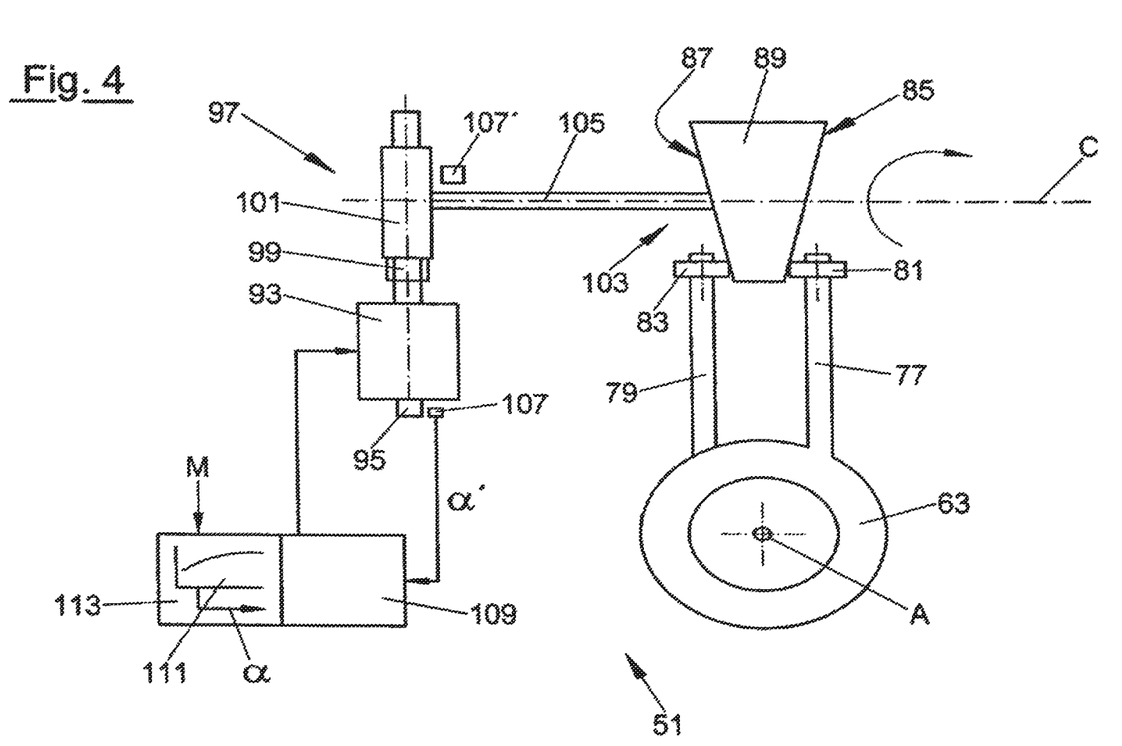
FIG. 4 shows a schematic view of a clutch actuator.

FIG. 4 shows the actuator 51 according to FIGS. 2 and 3 in a schematic view. The actuator 51 has a controllable electric motor 93 with an armature shaft 95, a reduction gear 97 with a worm 99 and a worm gear 101 as well as a deflection device 103. By means of the deflection device 103, a rotational movement of an output shaft 105 of the reduction gear 97 is converted into a translatory, i.e. linear, movement of the contact pressure ring 73 (FIG. 3). The deflection device 103 comprises the control disk 89 as well as the supporting ring 63 and the adjustment ring 65 with the activation levers 77, 79 and the balls 71 according to FIG. 3. A sensor 107, which is embodied, for example, as an incremental encoder, is arranged on the armature shaft 95 of the electric motor 93. As is shown in FIG. 4, the sensor 107 can alternatively also be arranged as a sensor 107' on the output shaft 105.

The sensor 107 generates a signal which corresponds to an actuator position value. In the exemplary embodiment shown, this is the rotational angle actual value $\alpha'$ of the armature shaft 95. This signal a' is fed to a control device 109 of the transfer case 15. The control device 109 also receives a torque request M, that is to say a setpoint value of the clutch torque, from the driving dynamics regulating unit 33 of the motor vehicle (FIG. 1). On the basis of the torque request M, the control device 109 determines a rotational angle setpoint value α from a clutch torque/rotational angle characteristic curve 111 which is stored in a non-volatile memory 113 of the control device 109. The control device 109 generates a control signal for the electric motor 93 in accordance with the difference between the rotational angle setpoint value α and the rotational angle actual value α', in order to correspondingly adjust the friction clutch 49 (FIGS. 2 and 3). The control device 109 therefore acts as a position regulator.

According to the invention, the control device 109 is also designed to determine the time-dependent setting behavior of the friction clutch 49 and to take it into account in the actuation of said friction clutch 49 in that said control device 109 regulates the engagement position of the clutch unit 47 in accordance with the determined setting behavior by correspondingly actuating the actuator 51 or its electric motor 93, as a result of which the setting behavior is compensated in favor of the positioning accuracy of the clutch unit 47. The determination of the time-dependent setting behavior of the friction clutch 49 takes place here by determining the current setting value of the friction clutch 49 as an output value of the filter by means of a transmission element (illustrated more precisely in FIG. 6) in the form of a PT1 element which is embodied as a low-pass filter.

Figure 5:
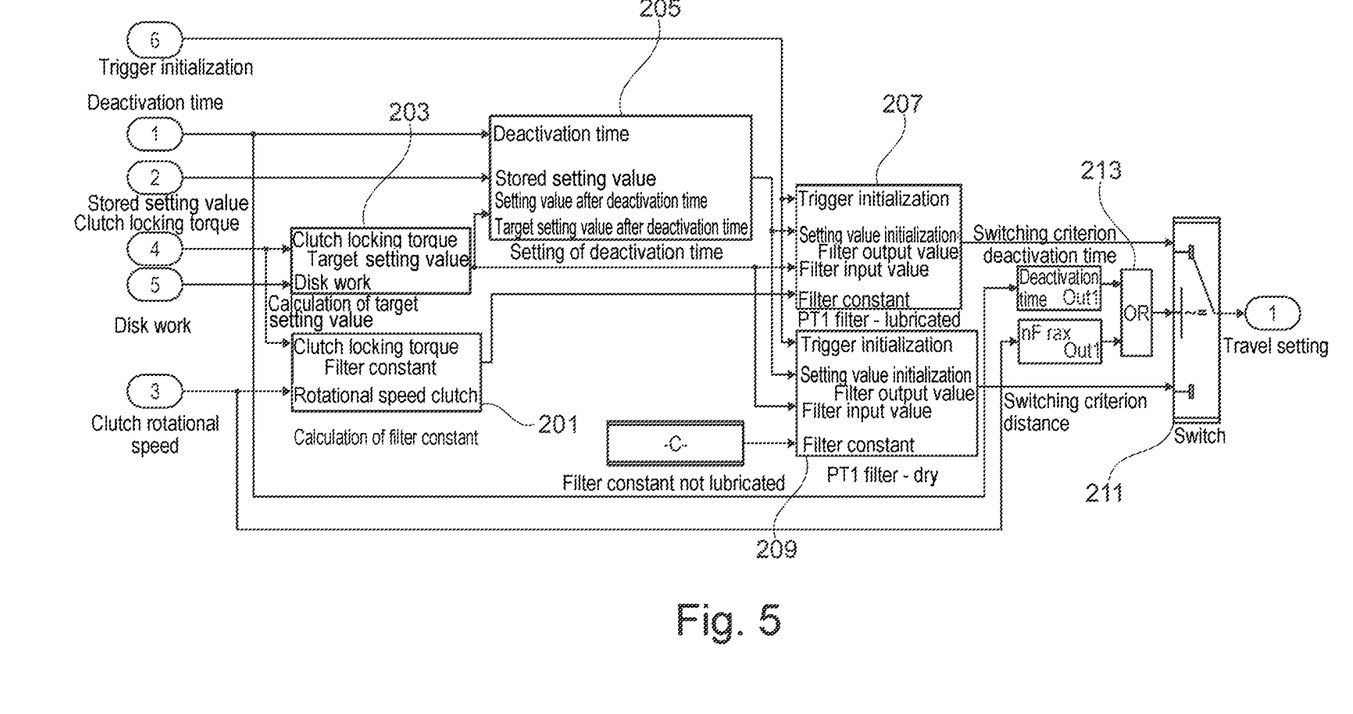
FIG. 5 shows the setting value calculation according to the invention in the form of a block circuit diagram.
Figure 6:
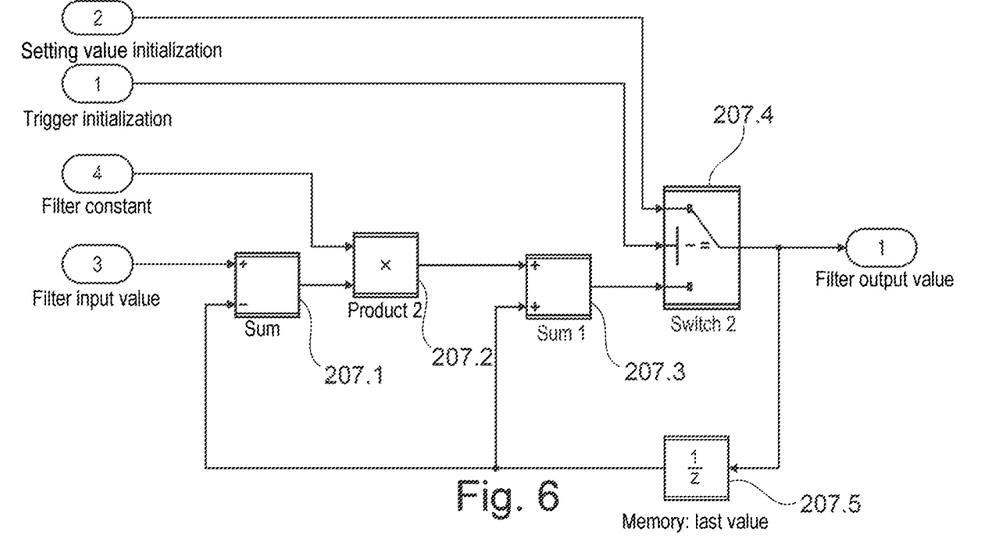
FIG. 6 shows the PT1 element of the setting value calculation in FIG. 5.

The PT1 element which is illustrated in FIG. 6 is visualized with blocks 207 and 209 in FIG. 5 which shows a block circuit diagram of the setting value calculation according to the invention including the calculation of the time constant (block 201), the final setting value calculation (block 203) and the calculation of the setting value for the initialization of the transmission element (block 205), wherein block 207 carries out the setting value calculation for the lubricated state, and block 209 carries out the setting value calculation for the non-lubricated or dry state of the friction clutch 49. The setting value calculation of the blocks 207 and 209 is carried out in parallel or simultaneously here irrespective of the actual lubrication state of the clutch, since only the respectively relative setting value is output and passed on for regulating purposes by the assigned switch 211, the method of functioning of which will be explained in more detail below.

The PT1 element 207 for the lubricated state is described in more detail below with reference to FIG. 6, but the PT1 element 209 is correspondingly embodied and operates for the dry state. The PT1 element 207 receives as the input value at the summing node 207.1, on the one hand, a final setting value and, on the other hand, the output value, which is output by the switch 207.4, of the PT1 element 207 or the last determined current setting value and which is fed back with a certain delay according to block 207.5 to the summing node 207.1, on the one hand, and to the summing node 207.3, on the other hand. The summing node 207.1 then determines the difference between the final setting value and the last determined current setting value and passes on this difference to the multiplier node 207.2 which multiplies the determined difference by the filter constant or time constant of the PT1 element. At the second summing node 207.3, the current, fed-back setting value which was calculated last is added to the product which is formed in this way, so that the switch 207.4 can output the resulting sum as an output value of the filter and therefore as a current setting value. On the basis of the setting value which is determined in this way, the engagement position of the clutch unit 47 can then be subsequently adjusted by corresponding actuation of the actuator 51 or its electric motor 93, as a result of which the setting behavior of the friction clutch 49 can be compensated in favor of its positioning accuracy.

If the setting value calculation of the PT1 elements 207, 209 is inactive for a relatively long time, the switch 207.4 can be actuated via the input "1" for the purposes of initializing the PT1 elements 207, 209, in order to obtain, as an input value, an estimated setting value for the purposes of initializing the respective PT1 element, which setting value is fed back to the two summing nodes 207.1 and 207.3 in the next loop pass as a current setting value with a certain delay according to the node 207.5.

Figure 7:
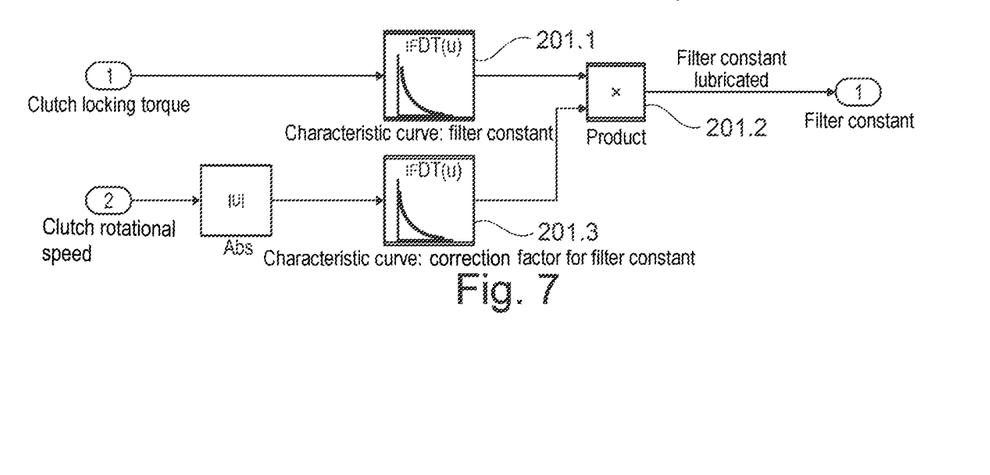
FIG. 7 shows the calculation of the time constant or filter constant of the PT1 element.

According to the invention there is also provision that the time constant or filter constant which is fed to the multiplier node 207.2 does not have a fixed value; instead the time constant can be set in a variable fashion in accordance with the desired locking torque of the friction clutch 49, as is explained in more detail below with reference to the block circuit diagram in FIG. 7.

Therefore, the time constant for the lubricated state of the friction clutch 59 is determined in accordance with the locking torque in block 201.1 on the basis of a characteristic curve, lookup table or calculation function stored therein, in accordance with the locking torque. However, since it has been detected according to the invention that the speed of approach of the current setting value to the final setting value can also change in accordance with the rotational speed of the clutch, the filter constant which is determined in this way is multiplied at the multiplier node 201.2 with a correction factor which is dependent on the rotational speed of the clutch and can be determined in block 201.3 by means of a characteristic curve, lookup table or calculation function stored there, in accordance with the clutch rotational speed. The filter constant which is modified in this way at the multiplier node 201.2 can then be made available to the PT1 element 207 for the lubricated state. In contrast, the PT1 element 209 for the dry state makes recourse, according to the block circuit diagram in FIG. 5, to a continuously constant time constant, since according to the invention it has been detected that the speed of approach of the current setting value to the final setting value in the dry state does not have any dependence on the set locking torque of the friction clutch 49.

As has already been explained above with reference to the block circuit diagram in FIG. 5, the PT1 elements 207 and 209 determine the current setting value as an output value of the transmission function with, inter alia, the final setting value as an input value. This final setting value or target setting value can be determined here according to the block circuit diagram in FIG. 8 from the locking torque of the clutch 49, on the one hand, and the disk work or the degree of wear of the clutch 49, on the other hand. Therefore, in block 203.1 a target setting value or final setting value is determined on the basis of a characteristic curve, lookup table or calculation function stored there, in accordance with the desired locking torque, said value being multiplied at the multiplier node 203.3 by a correction factor which is modified in block 203.2 by multiplication on the basis of a characteristic curve, lookup table or calculation function stored there, in accordance with the disk work or the degree of wear of the friction clutch. The target setting value or final setting value which is modified in this way can then be fed to the PT1 element 207 and the PT1 element 209 as an input value for the setting value calculation.

Figure 8:
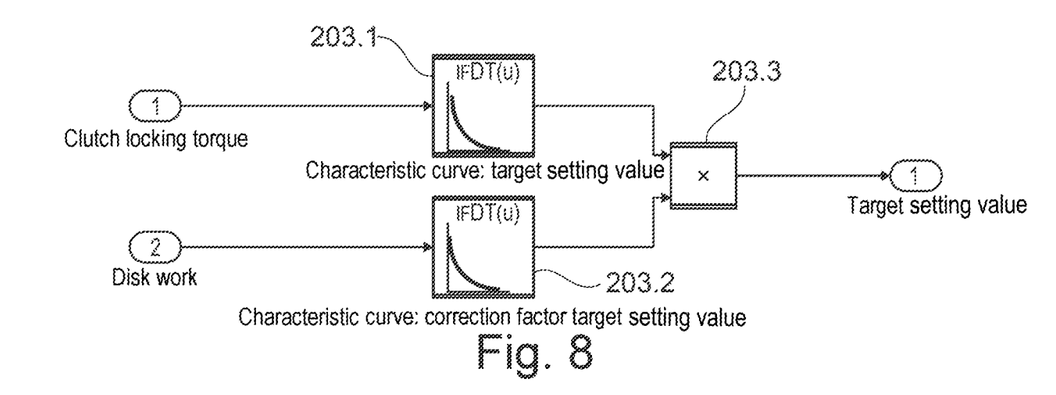
FIG. 8 shows the calculation of the final setting value calculation.

The degree of wear, on the basis of which the correction factor for modifying the target setting value is determined in the block 203.2, can be determined here by forming the time integral of the product from the clutch torque and a clutch slip in the form of a rotational speed difference between the input element 53 and the output element 55.

Figure 9:
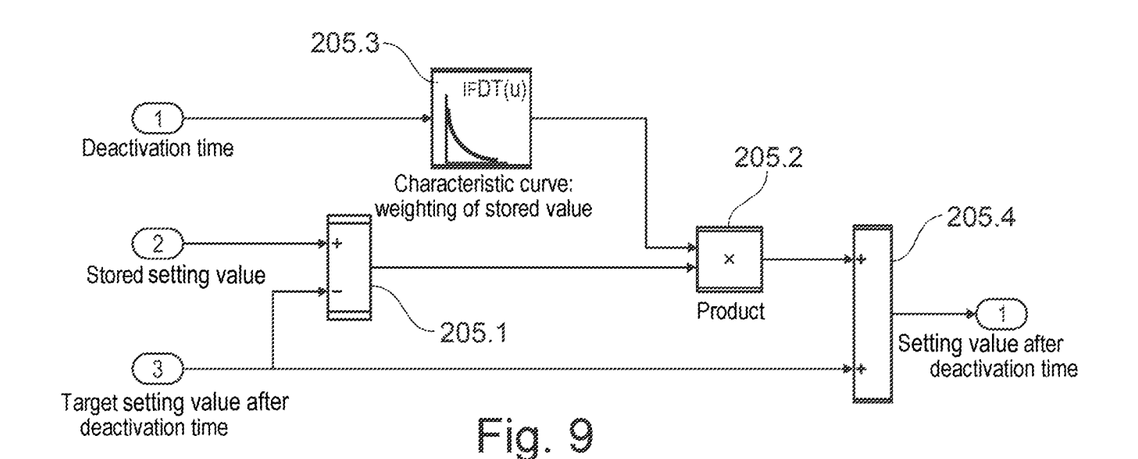
FIG. 9 shows the calculation of the setting value for the initialization of the PT1 element.

The estimation of the setting value, which estimation is fed to the switch 207.4 of the PT1 element 207 for the lubricated state or a corresponding switch of the PT1 element for the dry state for initialization of the respective filter, is described below with reference to the block circuit diagram in FIG. 9. For this purpose, the deviation or the difference between a setting value which was calculated last or a stored setting value and the target setting value or final setting value is firstly determined by the summing node 205.1, after which this difference is multiplied at the multiplier node 205.2 by a weighting factor which has been determined in the block 205.3 on the basis of a characteristic curve, lookup table or calculation table stored there, in accordance with the time which has passed since the last determined setting value. The deviation, which has been modified or weighted in accordance with the deactivation time, between the last stored setting value and the final setting value is then passed on to a summing node 205.4 which adds the final setting value or target setting value to this modified setting value deviation, in order to make available as an output value a setting value for the initialization of the PT1 element 207, 209 which has been interpolated between the last determined setting value and the final setting value.

As has already been explained, according to the invention there is provision that the calculation of the two PT1 elements 207 and 209 takes place simultaneously, but only the setting value of that PT1 element 207, 209 which corresponds to the current lubrication state of the friction clutch 49 is passed on by the switch 211 (see FIG. 5) for the regulation of the engagement position of the clutch unit 47. For this purpose, an OR gate 213 is connected upstream of the switch 211, said gate 213 passing on, in accordance with a predetermined deactivation time and/or a predetermined distance, either the output value of the PT1 element 207 for the lubricated state or the output value of the PT1 element 209 for the non-lubricated or dry state, as an output value for the regulation of the engagement position. For example, the OR gate 213 can infer a non-lubricated state of the friction clutch 49 here if it detects that the motor vehicle has been or was parked for a predetermined deactivation time, as can be the case, for example, if the summed clutch rotational speed does not change any more for a predetermined period. Otherwise, or in the event of a clutch rotational speed which is integrated over a predetermined time period exceeding a predetermined rotational speed value, the OR gate 213 can infer the lubricated state and correspondingly switch the switch 211 in such a way that it passes on the output value of the PT1 element 209 for the dry state.

While the invention is applied particularly advantageously in a transfer case with electromechanical activation of the friction clutch, the invention is not limited to the exemplary embodiment explained above. Other arrangements in the drive train of a motor vehicle are also possible, as explained at the beginning. In addition, the actuator 51 can be embodied differently than explained above in conjunction with the figures. For example, a different type of reduction gear 97 or a different type of deflection device 103 can be provided. Instead of the electromechanical activation of the friction clutch 49 as shown, it is, for example, also possible to provide electromagnetic, hydraulic or electrohydraulic activation. In this case, instead of the explained rotational angle/clutch torque characteristic curve 111, for example a pressure/clutch torque characteristic curve is adapted in accordance with the degree of wear of the clutch unit.

LIST OF REFERENCE DESIGNATIONS

11 Internal combustion engine
13 Main transmission
15 Transfer case
17 Cardan shaft
19 Rear-axle differential gear
21 Wheel
23 Rear axle
25 Cardan shaft
27 Front-axle differential gear
29 Wheel
31 Front axle
33 Driving dynamics regulating unit
35 Wheel rotational speed sensor
37 Wheel rotational speed sensor
39 Sensor
41 Input shaft
43 First output shaft
45 Second output shaft
47 Clutch unit
49 Friction clutch
51 Actuator
53 Clutch basket
55 Clutch hub
57 Drive gearwheel
59 Chain drive
61 Output gearwheel
63 Supporting ring
65 Adjustment ring
67 Ball groove
69 Ball groove
71 Ball
73 Contact pressure ring
75 Disk spring arrangement
77 Activation lever
79 Activation lever
81 Roller
83 Roller
85 End face
87 End face
89 Control disk
91 Spline attachment
93 Electric motor
95 Armature shaft
97 Reduction gear
99 Worm
101 Worm gear
103 Deflection device
105 Output shaft
107 Position sensor
107' Position sensor
109 Control device
111 Clutch torque/rotational angle characteristic curve
111' Characteristic curve with modified gradient
111" Characteristic curve with modified offset
113 Memory
A Rotational axis
B Rotational axis
C Rotational axis

What is claimed is:
1. A method for regulating the engagement position of a position-controlled clutch unit for a drive train of a motor vehicle, wherein the clutch unit has at least one wet-running friction clutch, in particular an oil-lubricated multi-disk clutch, for the controllable transmission of a torque from an input element to an output element of the friction clutch, and an actuator for setting the engagement position for the purposes of mutual compression of the input and output elements, wherein the method compensates a time-dependent setting behavior of the friction clutch on the basis of the uptake of lubrication oil of the friction clutch, which varies over time, in that the engagement position of the clutch unit is regulated by means of the actuator as a function of the time-dependent setting behavior.

2. The method as claimed in claim 1,
wherein the time-dependent setting behavior is determined in that a current setting value of the friction clutch is determined by means of a transmission element, in particular a PT1 element.

3. The method as claimed in claim 2,
wherein
the transmission element is distinguished by an adjustable time constant which is determined in a lubricated state of the friction clutch as a function of a desired locking torque of the friction clutch, wherein a correction value which is representative of the current rotational speed of the friction clutch is preferably taken into account during the determination of the time constant.

4. The method as claimed in claim 3,
wherein
in a non-lubricated state of the friction clutch the time constant is assigned a fixed value.

5. The method as claimed in claim 3,
wherein
a non-lubricated state of the friction clutch is inferred if it is detected that the motor vehicle is shut down for at least one predetermined deactivated state, whereas on the other hand, or if it is detected that a clutch rotational speed which is integrated over a predetermined time period exceeds a predetermined rotational speed value, the lubricated state of the friction clutch is inferred.

6. The method as claimed in claim 1,
wherein
the time-dependent setting behavior of the friction clutch is determined in that a current setting value of the friction clutch, by means of a transmission element, in particular a PT1 element, is determined as an output value of the transmission element as a function of a calculated final setting value, specifically, in particular irrespective of whether the friction clutch is in a lubricated state or in a non-lubricated state.

7. The method as claimed in claim 6,
wherein
the final setting value is determined as a function of a desired locking torque of the friction clutch, wherein a degree of wear of the friction clutch is preferably taken into account during the determination of the final setting value, which degree of wear is acquired, in particular, in that a time integral is formed over the product of the clutch torque and a clutch slip in the form of a difference in rotational speed between the input element and the output element.

8. The method as claimed in claim 6,
wherein
the input value of the transmission element is initialized with an estimated setting value, specifically, in particular, after re-activation of the vehicle after a predetermined deactivation time, wherein the estimated setting value is preferably determined as a function of the last determined setting value, the time which has passed since the last determined setting value was determined, and the final setting value.

9. A torque transmission arrangement having a position-controlled clutch unit for a drive train of a motor vehicle and a control device, the clutch unit having at least one wet-running friction clutch, in particular an oil-lubricated multi-disk clutch, for the controllable transmission of a torque from an input element to an output element of the friction clutch, and an actuator for setting the engagement position for the purposes of mutual compression of the input and output elements; and
wherein the control device is designed to compensate a time-dependent setting behavior of the friction clutch on the basis of an uptake of lubrication oil of the friction clutch, which varies over time, in that said control device regulates the engagement position of the clutch unit by means of the actuator as a function of the time-dependent setting behavior.

10. The torque transmission arrangement as claimed in claim 9,
wherein
the control device is also designed to regulate the engagement position of the clutch unit while taking into account the method as claimed in at least one of claims 2 to 8.

11. The method as claimed in claim 4,
wherein the non-lubricated state of the friction clutch is inferred if it is detected that the motor vehicle is shut down for at least one predetermined deactivated state, whereas on the other hand, or if it is detected that a clutch rotational speed which is integrated over a predetermined time period exceeds a predetermined rotational speed value, the lubricated state of the friction clutch is inferred.

12. The method as claimed in claim 7,
wherein the input value of the transmission element is initialized with an estimated setting value, specifically, in particular, after re-activation of the vehicle after a predetermined deactivation time, wherein the estimated setting value is preferably determined as a function of the last determined setting value, the time which has passed since the last determined setting value was determined, and the final setting value.

* * * * *